June 17, 1952 G. N. COMTE 2,600,973
DEVICE FOR MEASURING THE RESONANCE-MAGNIFICATION
OF RESONANT SYSTEMS
Filed Jan. 18, 1950 3 Sheets-Sheet 2

INVENTOR.
GEORGES N. COMTE
BY

INVENTOR.
GEORGES N. COMTE

Patented June 17, 1952

2,600,973

UNITED STATES PATENT OFFICE 2,600,973

DEVICE FOR MEASURING THE RESONANCE-MAGNIFICATION OF RESONANT SYSTEMS

Georges N. Comte, Lyon, France, assignor to Compagnie Generale d'Electricite, Paris, France, a French corporation Application January 18, 1950, Serial No. 139,168
In France February 8, 1949

12 Claims. (Cl. 315—22)

1

The object of the present invention is an improvement in devices for measuring the Q factor of resonant systems. It is applicable not only to the measurement of the Q factor of electromagnetic resonating systems such as circuits with inductance and capacity, resonant line circuits, resonant cavities, but also to the measurement of any system of which the mechanical vibrations can be transformed into electrical vibrations.

It is known, in order to measure the Q factor of an electrical circuit at frequencies in the neighbourhood of its resonance frequency, to employ the following method:

The system to be studied is coupled with an oscillator supplying a frequency of instantaneous value $f$, frequency-modulated by a periodic voltage of frequency F which is low in relation to $f$.

The frequency $f$ thus varies periodically in relation to the frequency F by a quantity $\pm \Delta f$ around a mean frequency $f_0$.

This frequency $f_0$ can be made to coincide with the resonance frequency of the system to be studied.

This system then begins to oscillate in the neighbourhood of its resonance frequency and this oscillation assumes a maxium amplitude when the frequency $f$ passes through the value equal to said resonance frequency.

A very small amount of power is then taken in the oscillatory system, which does not appreciably attenuate it, and in this way a voltage is obtained which is detected, and which is then a voltage of the instantaneous amplitude of the oscillations of the system to be studied. This function is applied to the amplifier controlling the vertical deflection of the beam of a cathode ray oscillograph; this beam is, moreover, horizontally deflected at the frequency F, by a voltage in proportion to time. The curve appearing on the screen of the oscillograph gives the image of the variation of amplitude of the oscillations of the oscillatory system as a function of the frequency, for the frequencies in the vicinity of the resonance frequency $f_0$ of said system. This curve is all the sharper the greater the Q factor of the system. In order to determine this Q factor it is therefore sufficient to measure the difference of the frequencies $f_1$ and $f_2$ which correspond to two well-defined points $P_1$ and $P_2$ of the resonance curve.

The ordinate of these points is chosen so as to correspond to oscillations of such an amplitude that the power necessary to sustain them is half the power necessary to sustain oscillations having an amplitude equal to the maximum amplitude of the resonance curve.

In order to measure this frequency difference $f_2-f_1$ the known systems employ a wave-meter composed of a second calibrated resonant system, of which the resonance frequency can be caused to vary around the value $f_0$. This wavemeter also is energised by the frequency-modulated generator, and the voltage on its output is also applied, after amplification and detection, to the vertical deflection amplifier of the cathode ray oscillograph, on the screen of which it produces a luminous marking which is superposed on the curve studied.

By varying the timing of the wavemeter, the displacement of this marking is effected, and it can be caused to coincide successively with the points $P_1$ and $P_2$, while reading each time on the wavemeter the value of the corresponding frequency.

A method of this kind is very rapid, and makes it possible theoretically to measure very high Q factors. On the other hand it requires the marking which corresponds, on the screen of the oscillograph, to the resonance frequency of the wavemeter, to be sufficiently fine in relation to the distance between the branches of the resonance curve to be studied. In other words, the Q factor of the wavemeter itself must be much greater than the Q factor which it is desired to measure.

It is sometimes difficult to fulfill this condition, particularly in measurements of very short waves, in which a considerable Q factor may be met, of the order of several tens of thousands; the Q factor of the wavemeter then runs the risk of being insufficient to permit accurate measurement, since the resonance curve of the wavemeter would be wider than the curve studied.

The object of the present invention is an arrangement making it possible to cause the appearance, on the resonance curve of the system to be studied, of a very fine luminous point of which the abscissa corresponds to the frequency to which a wavemeter is adjusted, fed by the same source as the circuit to be studied, in such a way that it is possible, by altering the adjustment of said wavemeter, to shift said point on the curve, while knowing at any moment the frequency which corresponds thereto.

In this device, the Wehnelt cylinder of the cathode ray tube on which the resonance curve of the circuit to be studied appears, is polarized, so as to suppress the electronic beam for a certain frequency band on either side of the resonance frequency of the wavemeter, and to allow it to pass said frequency; thus a dark area, in the centre of which a brilliant luminous point appears, is obtained on the resonance curve of the circuit to be studied.

In order to achieve this result, a device according to the invention, comprises a control circuit for cathode ray tubes having a Wehnelt cylinder, in combination, an element supplied with a periodically varying voltage, a differentiating set connected to the output of the element supplied with a periodically varying voltage, the differentiating set yielding a voltage being substantially the differential in relation to time of the voltage supplied to the element, a phase transformer connected to the output of the differentiating set and yielding two voltages being in phase opposition to each other, two electronic tubes symmetrically arranged and connected to the secondary winding of the phase transformer, the tubes being fed by the voltages being in phase opposition to each other, respectively, yielded by the phase transformer, a common anode circuit connected to the tubes, the anode circuit yielding a voltage of constant direction, a source of polarization of the Wehnelt cylinder of the cathode ray tube, and a resistance arranged in series between the source of polarization and the Wehnelt cylinder of the cathode ray tube and traversed by the anode current of the two tubes so that the voltage drop across the resistance charges the Wehnelt cylinder of the cathode ray tube so as to pass the cathode beam in the absence of a current in the common anode circuit of the two tubes and to stop the same when a current is flowing in the common anode circuit, whereby a mark of extreme fineness is produced on the screen of the cathode ray tube.

The attached drawings, which are to be regarded as non-limitative examples, permit an easier understanding of the operation of the device which is the object of the invention.

Figure 1:
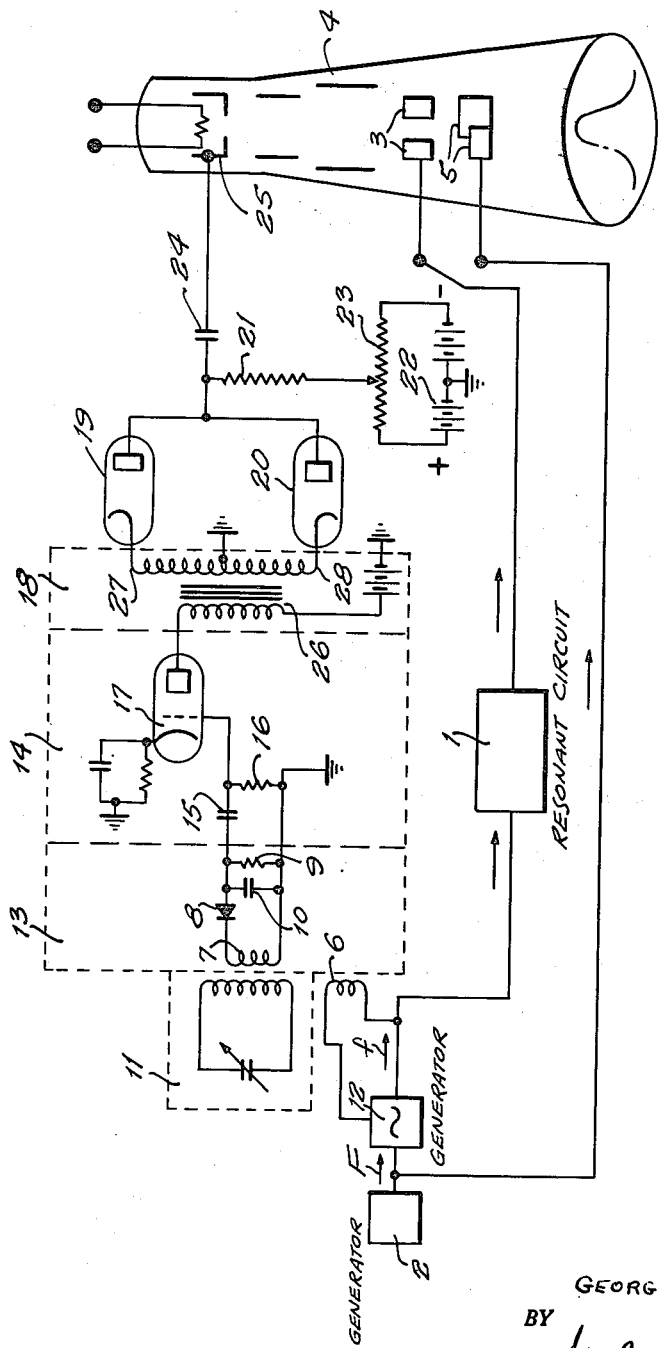
Fig. 1 is a general diagram of one embodiment of this device.

In Fig. 1, 1 represents the circuit of which the Q-factor is to be measured, and of which the resonance frequency is $f_0$; this circuit is coupled to a generator 12, supplying a voltage of mean frequency equal to $f$, frequency-modulated by a voltage of frequency F supplied by a generator 2.

The voltage on the output of circuit 1 is applied to the vertical deflecting plates 3 of a cathode-ray tube 4, the horizontal deflection plates 5 of which are fed by the voltage at the frequency F supplied by the generator 2. The resonance curve of the circuit 1 around the frequency $f_0$ then appears on the screen of the oscillograph.

The generator 12 is coupled on the other hand, by a coil 6, to a wavemeter 11, of which the resonance frequency is adjustable in the vicinity of the frequency $f_0$. A fraction of the energy developed in this wavemeter is applied, via a loop or coupling coil 7, or via an antenna (not shown), to a detector 13, comprising a vacuum tube or crystal 8, in series with a resistance 9 shunted by a condenser 10.

The voltage on the terminals of this resistance 9 is at any moment a function of the amplitude of the oscillations; these oscillations are, as previously explained, modulated at the frequency F so that the voltage on the terminals of resistance 9 varies periodically as a function of the time at the frequency F; and it is at a maximum when the frequency of the oscillations passes through the mean value to which the wavemeter is adjusted. This variation is represented by the curve in Fig. 2.

Figure 3:
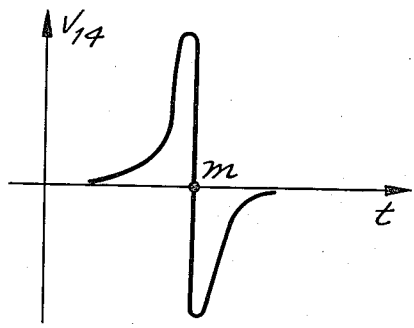

The voltage on the terminals of resistance 9 is then applied to a differentiating set 14, comprising a condenser 15, in series with a resistance 16, followed if need be by one or more amplifier tubes such as 17. The voltage on the output of the set 14 is the algebraical derivative in relation to time of the voltage applied to the input; the variation of this output voltage is shown in Fig. 3; it is zero when the input voltage is a maximum.

On the output of differentiating set 14, the voltage is applied to a phase-transformer 18, consisting of a transformer 26 with a center-tapped secondary winding, or again by an arrangement employing vacuum tubes. The transformer 26 transforms the voltage applied to its primary winding into two voltages in phase opposition, collected, respectively, at the terminals 27 and 28 of the secondary winding.

These voltages are, respectively, applied to two vacuum tubes 19 and 20 symmetrically mounted, their plate circuits feeding in parallel a resistance 21 in such a way that the drop of potential in this resistance has the same direction for the two positive and negative alternations of the voltage on the terminals of the secondary winding of 26, and that it is zero at the same time as the latter.

Figure 2:
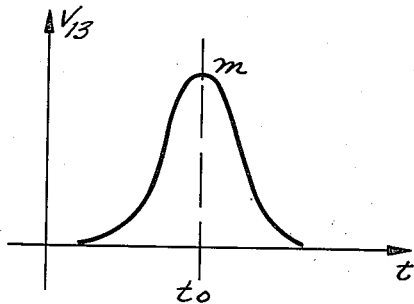
Figs. 2, 3 and 4 are diagrams, respectively, showing the variation as a function of time of the voltage taken at various points of the system according to Fig. 1.
Figure 4:
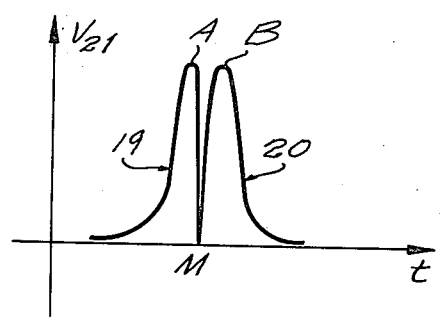

The voltage thus collected on the terminals of resistance 21 is represented by the curve of Fig. 4; this curve comprises 2 peaks, one A corresponding to the voltage coming from the tube 19, the other B corresponding to the voltage coming from tube 20; these two peaks are separated by a point M for which the voltage is zero, which point corresponds to the peak of the curve of Fig. 2, that is to say, at the moment when the frequency of the voltage applied to the wavemeter passes through the mean value to which the latter is adjusted.

The drop to zero between the two peaks is extremely rapid, because the variation of the voltage differentiated by the system 14 is very sudden in the vicinity of the zero value.

In the example of Fig. 1, the two tubes 19 and 20 are diodes, and the voltage supplied by transformer 26 is applied to their cathodes. A potentiometer 23, inserted in the circuit of the source 22 of anode voltage, of which the middle point is grounded, makes it possible to adjust the operative point of the diodes.

The voltage in the resistance 21 is applied, by means of a condenser 24, to the Wehnelt cylinder 25 of the cathode ray tube 4, and polarizes this cylinder so that the beam of said tube is only emitted when said voltage is substantially zero, and it is extinguished by the two peaks of potial A and B.

Figure 5:
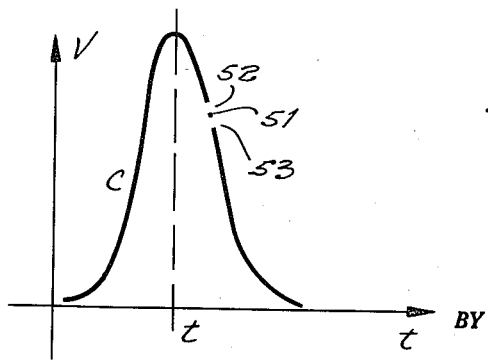
Fig. 5 is a view of the figure which may be seen on the screen of the cathode ray tube.

Thus on the screen of the cathode ray tube, in addition to the resonance curve C of the oscillatory system to be studied, shown in Fig. 5, a very fine brilliant point 51 is observed, corresponding to the point M between the two peaks A and B, surrounded by two dark zones 52 and 53, respectively, corresponding to the said two peaks.

By varying the resonance frequency of the wavemeter it is possible to shift the point 51 on the curve C, while reading the corresponding frequency on the graduation of the wavemeter.

The point being very fine, the measurements may be made with great accuracy.

The device according to the invention has the advantage of making it possible to adjust the voltages obtained at the output of the wavemeter and of the circuit to be measured independently of each other, said voltages acting, respectively, on the brilliance of the luminous point on the screen, and on the vertical deflecting of the cathode ray. The result is that the adjustment of the wavemeter cannot react on the shape of the curve of resonance of the circuit studied, which ensures great flexibility of adjustment.

Figure 6:
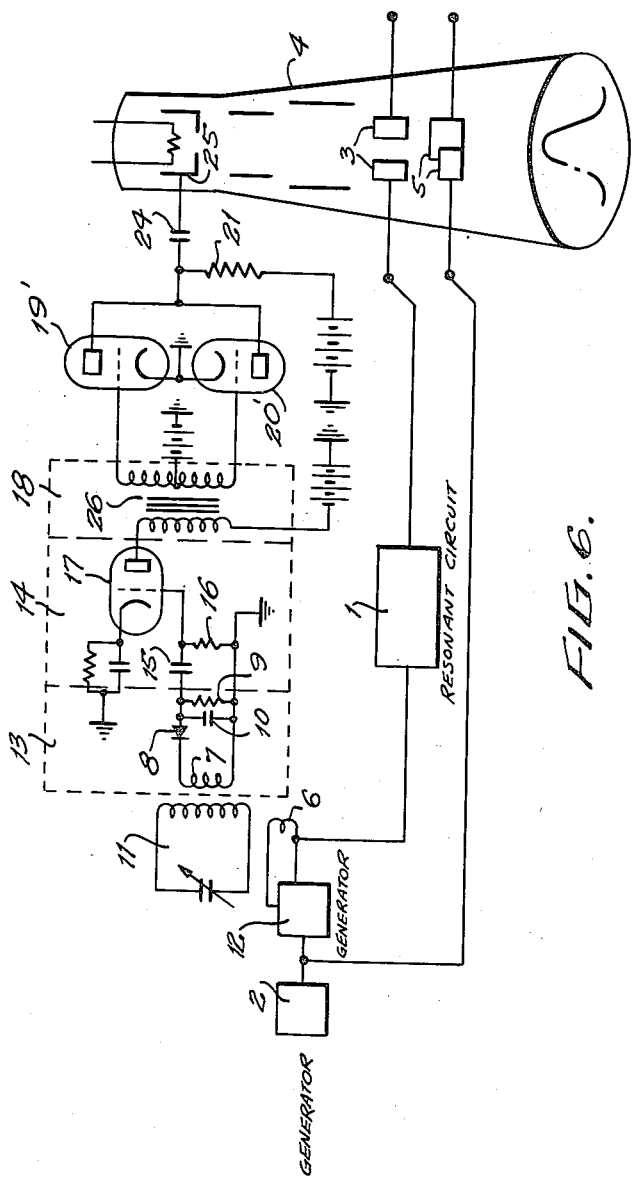
Fig. 6 is a wiring diagram of another embodiment.

Fig. 6 shows, by way of example, a modified embodiment of the device according to the invention, in which the two tubes, 19 and 20, are triodes forming part of a class B push-pull amplifier, the grids of which are fed in phase-opposition by the phase-transformer system 18, so that they are alternately conductive and non-conductive and play the same part as the diodes of the device of Fig. 1. They can, however, be followed by an amplifier valve which makes it possible to apply a higher potential to the Wehnelt cylinder of the cathode ray tube.

What is claimed is:

1. In a control circuit for cathode ray tubes having a Wehnelt cylinder, in combination, an element supplied with a periodically varying voltage; a differentiating set connected to the output of said element supplied with a periodically varying voltage, said differentiating set yielding a voltage being substantially the differential in relation to time of the voltage supplied to said element; a phase transformer connected to the output of said differentiating set and yielding two voltages being in phase opposition to each other; two electronic tubes symmetrically arranged and connected to the secondary winding of said phase transformer, said tubes being fed by the voltages being in phase opposition to each other, respectively, yielded by said phase transformer; a common anode circuit connected to said tubes, said anode circuit yielding a voltage of constant direction; a source of polarization of the Wehnelt cylinder of the cathode ray tube; and a resistance arranged in series between said source of polarization and the Wehnelt cylinder of the cathode ray tube and traversed by the anode current of said two tubes so that the voltage drop across said resistance charges the Wehnelt cylinder of the cathode ray tube so as to pass the cathode beam in the absence of a current in said common anode circuit of said two tubes and to stop the same when a current is flowing in said common anode circuit, whereby a mark of extreme fineness is produced on the screen of the cathode ray tube.

2. In a control circuit for cathode ray tubes having a Wehnelt cylinder, in combination, an element supplied with a periodically varying voltage; a differentiating set including a capacity and a first resistance connected in series with each other, the impedance of said capacity being higher than that of said first resistance, said differentiating set being connected to the output of said element supplied with a periodically varying voltage, said differentiating set yielding a voltage being substantially the differential in relation to time of the voltage supplied to said element; a phase transformer connected to the output of said differentiating set and yielding two voltages being in phase opposition to each other; two electronic tubes symmetrically arranged and connected to the secondary winding of said phase transformer, said tubes being fed by the voltages being in phase opposition to each other, respectively, yielded by said phase transformer; a common anode circuit connected to said tubes, said anode circuit yielding a voltage of constant direction; a source of polarization of the Wehnelt cylinder of the cathode ray tube; and a second resistance arranged in series between said source of polarization and the Wehnelt cylinder of the cathode ray tube and traversed by the anode current of said two tubes so that the voltage drop across said second resistance charges the Wehnelt cylinder of the cathode ray tube so as to pass the cathode beam in the absence of a current in said common anode circuit of said two tubes and to stop the same when a current is flowing in said common anode circuit, whereby a mark of extreme fineness is produced on the screen of the cathode ray tube.

3. In a control circuit for cathode ray tubes having a Wehnelt cylinder, in combination, an element supplied with a periodically varying voltage; a differentiating set connected to the output of said element supplied with a periodically varying voltage, said differentiating set yielding a voltage being substantially the differential in relation to time of the voltage supplied to said element; an amplifier including at least one tube having a grid connected to the output of said differentiating set; a phase transformer connected to the output of said amplifier and yielding two voltages being in phase opposition to each other; two electronic tubes symmetrically arranged and connected to the secondary winding of said phase transformer, said tubes being fed by the voltages being in phase opposition to each other, respectively, yielded by said phase transformer; a common anode circuit connected to said tubes, said anode circuit yielding a voltage of constant direction; a source of polarization of the Wehnelt cylinder of the cathode ray tube; and a resistance arranged in series between said source of polarization and the Wehnelt cylinder of the cathode ray tube and traversed by the anode current of said two tubes so that the voltage drop across said resistance charges the Wehnelt cylinder of the cathode ray tube so as to pass the cathode beam in the absence of a current in said common anode circuit of said two tubes and to stop the same when a current is flowing in said common anode circuit, whereby a mark of extreme fineness is produced on the screen of the cathode ray tube.

4. In a control circuit for cathode ray tubes having a Wehnelt cylinder, in combination, an element supplied with a periodically varying voltage; a differentiating set including a capacity and a first resistance connected in series with each other, the impedance of said capacity being higher than that of said first resistance, said differentiating set being connected to the output of said element supplied with a periodically varying voltage, said differentiating set yielding a voltage being substantially the differential in relation to time of the voltage supplied to said element; an amplifier including at least one tube having a grid connected to the output of said differentiating set; a phase transformer connected to the output of said amplifier and yielding two voltages being in phase opposition to each other; two electronic tubes symmetrically arranged and connected to the secondary winding of said phase transformer, said tubes being fed by the voltages being in phase opposition to each other, respectively, yielded by said phase transformer; a common anode circuit connected to said tubes, said anode circuit yielding a voltage of constant direction; a source of polarization of the Wehnelt cylinder of the cathode ray tube; and a second resistance arranged in series between said source of polarization and the Wehnelt cylinder of the cathode ray tube and traversed by the anode current of said two tubes so that the voltage drop across said second resistance charges the Wehnelt cylinder of the cathode ray tube so as to pass the cathode beam in the absence of a current in said common anode circuit of said two tubes and to stop the same when a current is flowing in said common anode circuit, whereby a mark of extreme fineness is produced on the screen of the cathode ray tube.

5. In a control circuit for cathode ray tubes having a Wehnelt cylinder, in combination, an element supplied with a periodically varying voltage; a differentiating set connected to the output of said element supplied with a periodically varying voltage, said differentiating set yielding a voltage being substantially the differential in relation to time of the voltage supplied to said element; a phase transformer having a secondary winding composed of two symmetrical halves, said phase transformer being connected to the output of said differentiating set and yielding two voltages being in phase opposition to each other; two electronic tubes symmetically arranged and connected to the halves of said secondary winding of said phase transformer, said tubes being fed by the voltages being in phase opposition to each other, respectively, yielded by said phase transformer; a common anode circuit connected to said tubes, said anode circuit yielding a voltage of constant direction; a source of polarization of the Wehnelt cylinder of the cathode ray tube; and a resistance arranged in series between said source of polarization and the Wehnelt cylinder of the cathode ray tube and traversed by the anode current of said two tubes so that the voltage drop across said resistance charges the Wehnelt cylinder of the cathode ray tube so as to pass the cathode beam in the absence of a current in said common anode circuit of said two tubes and to stop the same when a current is flowing in said common anode circuit, whereby a mark of extreme fineness is produced on the screen of the cathode ray tube.

6. In a control circuit for cathode ray tubes having a Wehnelt cylinder, in combination, an element supplied with a periodically varying voltage; a differentiating set including a capacity and a first resistance connected in series with each other, the impedance of said capacity being higher than that of said first resistance, said differentiating set being connected to the output of said element supplied with a periodically varying voltage, said differentiating set yielding a voltage being substantially the differential in relation to time of the voltage supplied to said element; an amplifier including at least one tube having a grid connected to the output of said differentiating set; a phase transformer having a secondary winding composed of two symmetrical halves, said phase transformer being connected to the output of said amplifier and yielding two voltages being in phase opposition to each other; two electronic tubes symmetrically arranged and connected to the halves of said secondary winding of said phase transformer, said tubes being fed by the voltages being in phase opposition to each other, respectively, yielded by said phase transformer; a common anode circuit connected to said tubes, said anode circuit yielding a voltage of constant direction; a source of polarization of the Wehnelt cylinder of the cathode ray tube; and a second resistance arranged in series between said source of polarization and the Wehnelt cylinder of the cathode ray tube and traversed by the anode current of said two tubes so that the voltage drop across said second resistance charges the Wehnelt cylinder of the cathode ray tube so as to pass the cathode beam in the absence of a current in said common anode circuit of said two tubes and to stop the same when a current is flowing in said common anode circuit, whereby a mark of extreme fineness is produced on the screen of the cathode ray tube.

7. In a control circuit for cathode ray tubes having a Wehnelt cylinder, in combination, an element supplied with a periodically varying voltage; a differentiating set connected to the output of said element supplied with a periodically varying voltage, said differentiating set yielding a voltage being substantially the differential in relation to time of the voltage supplied to said element; a phase transformer connected to the output of said differentiating set and yielding two voltages being in phase opposition to each other; two diodes symmetrically arranged and having cathodes connected to the ends of the secondary winding of said phase transformer, respectively, said diodes being fed by the voltages being in phase opposition to each other, respectively, yielded by said phase transformer; a common anode circuit connected to said diodes, said anode circuit yielding a voltage of constant direction; a source of polarization of the Wehnelt cylinder of the cathode ray tube; and a resistance arranged in series between said source of polarization and the Wehnelt cylinder of the cathode ray tube and traversed by the anode current of said two diodes so that the voltage drop across said resistance charges the Wehnelt cylinder of the cathode ray so as to pass the cathode beam in the absence of a current in said common anode circuit of said two diodes and to stop the same when a current is flowing in said common anode circuit, whereby a mark of extreme fineness is produced on the screen of the cathode ray tube.

8. In a control circuit for cathode ray tubes having a Wehnelt cylinder, in combination, an element supplied with a periodically varying voltage; a differentiating set including a capacity and a first resistance connected in series with each other, the impedance of said capacity being higher than that of said first resistance, said differentiating set being connected to the output of said element supplied with a periodically varying voltage, said differentiating set yielding a voltage being substantially the differential in relation to time of the voltage supplied to said element; an amplifier including at least one tube having a grid connected to the output of said differentiating set; a phase transformer having a secondary winding composed of two symmetrical halves, said phase transformer being connected to the output of said amplifier and yielding two voltages being in phase opposition to each other; two diodes symmetrically arranged and having cathodes connected to the ends of the halves of said secondary winding of said phase transformer, respectively, said diodes being fed by the voltages being in phase opposition to each other, respectively, yielded by said phase transformer; a common anode circuit connected to said diodes, said anode circuit yielding a voltage of constant direction; a source of polarization of the Wehnelt cylinder of the cathode ray tube; and a second resistance arranged in series between said source of polarization and the Wehnelt cylinder of the cathode ray tube and traversed by the anode current of said two diodes so that the voltage drop across said second resistance charges the Wehnelt cylinder of the cathode ray tube so as to pass the cathode beam in the absence of a current in said common anode circuit of said two diodes and to stop the same when a current is flowing in said common anode circuit, whereby a mark of extreme fineness is produced on the screen of the cathode ray tube.

9. In a control circuit for cathode ray tubes having a Wehnelt cylinder, in combination, an element supplied with a periodically varying voltage; a differentiating set connected to the output of said element supplied with a periodically varying voltage, said differentiating set yielding a voltage being substantially the differential in relation to time of the voltage supplied to said element; a phase transformer connected to the output of said differentiating set and yielding two voltages being in phase opposition to each other; two electronic tubes symmetrically arranged and having grids connected to the secondary winding of said phase transformer, said tubes being fed by the voltages being in phase opposition to each other, respectively, yielded by said phase transformer; a common anode circuit connected to said tubes, said anode circuit yielding a voltage of constant direction; a source of polarization of the Wehnelt cylinder of the cathode ray tube; and a resistance arranged in series between said source of polarization and the Wehnelt cylinder of the cathode ray tube and traversed by the anode current of said two tubes so that the voltage drop across said resistance charges the Wehnelt cylinder of the cathode ray tube so as to pass the cathode beam in the absence of a current in said common anode circuit of said two tubes and to stop the same when a current is flowing in said common anode circuit, whereby a mark of extreme fineness is produced on the screen of the cathode ray tube.

10. In a control circuit for cathode ray tubes having a Wehnelt cylinder, in combination, an element supplied with a periodically varying voltage; a differentiating set including a capacity and a first resistance connected in series with each other, the impedance of said capacity being higher than that of said first resistance, said differentiating set being connected to the output of said element supplied with a periodically varying voltage, said differentiating set yielding a voltage being substantially the differential in relation to time of the voltage supplied to said element; an amplifier including at least one tube having a grid connected to the output of said differentiating set; a phase transformer having a secondary winding composed of two symmetrical halves, said phase transformer being connected to the output of said amplifier and yielding two voltages being in phase opposition to each other; two electronic tubes symmetrically arranged and having grids connected to the halves of said secondary winding of said phase transformer, respectively, said tubes being fed by the voltages being in phase opposition to each other, respectively, yielded by said phase transformer; a common anode circuit connected to said tubes, said anode circuit yielding a voltage of constant direction; a source of polarization of the Wehnelt cylinder of the cathode ray tube; and a second resistance arranged in series between said source of polarization and the Wehnelt cylinder of the cathode ray tube and traversed by the anode current of said two tubes so that the voltage drop across said second resistance charges the Wehnelt cylinder of the cathode ray tube so as to pass the cathode beam in the absence of a current in said common anode circuit of said two tubes and to stop the same when a current is flowing in said common anode circuit, whereby a mark of extreme fineness is produced on the screen of the cathode ray tube.

11. In a control circuit for cathode ray tubes having a Wehnelt cylinder, in combination, an element supplied with a periodically varying voltage; a differentiating set connected to the output of said element supplied with a periodically varying voltage, said differentiating set yielding a voltage being substantially the differential in relation to time of the voltage supplied to said element; a phase transformer connected to the output of said differentiating set and yielding two voltages being in phase opposition to each other; two electronic tubes symmetrically arranged and connected to the secondary winding of said phase transformer, said tubes being fed by the voltages being in phase opposition to each other, respectively, yielded by said phase transformer; a common anode circuit connected to said tubes, said anode circuit yielding a voltage of constant direction; a source of polarization of the Wehnelt cylinder of the cathode ray tube; and a resistance and a condenser arranged in series between said source of polarization and the Wehnelt cylinder of the cathode ray tube and traversed by the anode current of said two tubes so that the voltage drop across said resistance charges the Wehnelt cylinder of the cathode ray tube so as to pass the cathode beam in the absence of a current in said common anode circuit of said two tubes and to stop the same when a current is flowing in said common anode circuit, whereby a mark of extreme fineness is produced on the screen of the cathode ray tube.

12. In a control circuit for cathode ray tubes having a Wehnelt cylinder, in combination, an element supplied with a periodically varying voltage; a differentiating set including a capacity and a first resistance connected in series with each other, the impedance of said capacity being higher than that of said first resistance, said differentiating set being connected to the output of said element supplied with a periodically varying voltage, said differentiating set yielding a voltage being substantially the differential in relation to time of the voltage supplied to said element; an amplifier including at least one tube having a grid connected to the output of said differentiating set; a phase transformer having a secondary winding composed of two symmetrical halves, said phase transformer being connected to the output of said amplifier and yielding two voltages being in phase opposition to each other; two electronic tubes symmetrically arranged and connected to the halves of said secondary winding of said phase transformer, said tubes being fed by the voltages being in phase opposition to each other, respectively, yielded by said phase transformer; a common anode circuit connected to said tubes, said anode circuit yielding a voltage of constant direction; a source of polarization of the Wehnelt cylinder of the cathode ray tube; and a second resistance and a condenser arranged in series between said source of polarization and the Wehnelt cylinder of the cathode ray tube and traversed by the anode current of said two tubes so that the voltage drop across said second resistance charges the Wehnelt cylinder of the cathode ray tube so as to pass the cathode beam in the absence of a current in said common anode circuit of said two tubes and to stop the same when a current is flowing in said common anode circuit, whereby a mark of extreme fineness is produced on the screen of the cathode ray tube.

GEORGES N. COMTE.

REFERENCES CITED

The following references are of record in the file of this patent:

UNITED STATES PATENTS

| Number | Name | Date |
|---|---|---|
| 2,243,234 | Von Duhn | May 27, 1941 |
| 2,456,973 | Mao | Dec. 21, 1948 |